(12) United States Patent
Murray

(10) Patent No.: US 11,729,022 B2
(45) Date of Patent: Aug. 15, 2023

(54) UPLINK CONNECTIVITY IN RING NETWORKS

(71) Applicant: Hewlett Packard Enterprise Development LP, Houston, TX (US)

(72) Inventor: Christopher Murray, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 40 days.

(21) Appl. No.: 17/644,940

(22) Filed: Dec. 17, 2021

(65) Prior Publication Data

US 2023/0198803 A1  Jun. 22, 2023

(51) Int. Cl.
- H04L 12/437 (2006.01)
- H04L 45/00 (2022.01)
- H04L 43/10 (2022.01)

(52) U.S. Cl.
CPC .......... *H04L 12/437* (2013.01); *H04L 43/10* (2013.01); *H04L 45/26* (2013.01)

(58) Field of Classification Search
CPC ........ H04L 12/437; H04L 43/10; H04L 45/26
See application file for complete search history.

(56) References Cited

U.S. PATENT DOCUMENTS

| | | | |
|---|---|---|---|
| 10,122,588 B2 | 11/2018 | Murray et al. | |
| 10,367,654 B2 | 7/2019 | She et al. | |
| 10,470,111 B1 | 11/2019 | Murray | |
| 10,491,421 B2 | 11/2019 | Murray | |
| 10,516,625 B2 | 12/2019 | Murray | |
| 10,567,195 B2 | 2/2020 | Murray | |
| 11,171,810 B1 * | 11/2021 | Murray | H04L 12/4641 |
| 2019/0028298 A1 | 1/2019 | Murray | |
| 2019/0028299 A1 | 1/2019 | Murray | |
| 2019/0332501 A1 | 10/2019 | Murray | |
| 2019/0335386 A1 * | 10/2019 | Murray | H04L 43/0811 |
| 2020/0244516 A1 | 7/2020 | Murray | |

* cited by examiner

*Primary Examiner* — Jianye Wu
(74) *Attorney, Agent, or Firm* — Hewlett Packard Enterprise Patent Department

(57) ABSTRACT

Techniques for uplink connectivity determination are disclosed. In an example, a Frame Link Module (FLM) in a frame, belonging to a group of frames connected in a ring network, may generate an uplink discovery packet. The FLM may determine, based on a Link Layer Discovery Protocol (LLDP) packet received by the standby uplink from a customer network accessing the ring that the standby uplink has a link to the customer network. The FLM may forward the uplink discovery packet to the standby uplink via a Peripheral Component Interconnect (PCI) interface. The FLM may send the uplink discovery packet to the customer network through the standby uplink directed to an owner FLM. The owner FLM may monitor receipt of the uplink discovery packet from the customer network through a current active uplink and on successful receipt may determine that the standby uplink and switches in the customer network are correctly configured.

20 Claims, 7 Drawing Sheets

|   | 1 | 2 | 3 | 4 |
|---|---|---|---|---|
|   | 8 7 6 5 4 3 2 1 | 8 7 6 5 4 3 2 1 | 8 7 6 5 4 3 2 1 | 8 7 6 5 4 3 2 1 |
| 1 | MEL    Version (1) | OpCode (RAPS = 40) | Flags (0) | TLV Offset (32) |
| 5 | R-APS Specific Information (32 octets) ||||
| ... | ... ||||
| 37 | [optional TLV starts here; otherwise End TLV] ||||
| last |  |  |  | End TLV (0) |

Optional TLV contents (Octet 37 onwards)
- MAC Address of FLM 4
- IPv6 Link Layer Address of FLM 4
- Bay number of FLM 4
- MAC Address of Owner FLM 2
- LLDP Description for switch 275-2
- Management Port State of FLM 4
- Timeout information

FIG. 3

UPLINK CONNECTIVITY IN RING NETWORKS

BACKGROUND

In the field of scalable compute resources, network connectivity between frames of a scalable compute resource may represent a primary communication path for sharing data between those frames. The data may represent inputs to compute process (e.g., data or applications), outputs of compute resources (e.g., compute results), communications to coordinate distributed processes, and other types of data. A frame is a primary unit of the scalable compute resource with embedded management and scalable links that may be expanded to enhance the capabilities of the scalable compute resource. The scalable compute resource may contain multiple frames connected in a ring network where the frames of the scalable compute resource represent nodes of the ring network. Each frame may contain one or more compute blades. In some ring networks of scalable compute resources, the frames may be connected to each other using redundant network modules also called frame link modules (FLMs) in each frame.

The ring network is a network topology in which each node communicates to exactly two other neighbor nodes so that all communications pass around the ring network. To control data traffic and prevent network loops, some ring network implementations have a ring owner. The ring owner blocks traffic on one link to prevent loops. There may be only a single ring owner at a given point in time. Upon failure of a ring owner a new ring owner is selected.

A frame may include two FLMs. Each of the FLMs may have an uplink port, also referred to as an uplink, for connecting to external network resources, such as with network switches in customer networks. When configured in the ring network, a group of frames may only have a single active uplink to a customer network and have multiple standby uplinks which may be used as backup. If two uplinks become active concurrently an error condition, such as a loop, may be caused in the network and the network may crash. Coordinating amongst FLMs in a group of frames to ensure that only a single uplink is designated as active allows the group of frames to function properly. Upon failure of an active uplink, a new single active uplink may be selected (from a set of standby uplinks), responsive to detection of that failure. To work properly, the active uplink should be connected to an external network resource, such as with a network switch in a customer network, and the active uplink and the network switch should be properly configured. Improper hardware connections with the active uplink or misconfiguration of the active uplink or network switches in the customer network may result in loss of access to compute resources in the frames.

BRIEF DESCRIPTION OF THE DRAWINGS

Some implementations of the present disclosure are described with respect to the following figures.

FIG. 3 illustrates an example format of an uplink discovery packet for uplink connectivity determination.

Figure 1:
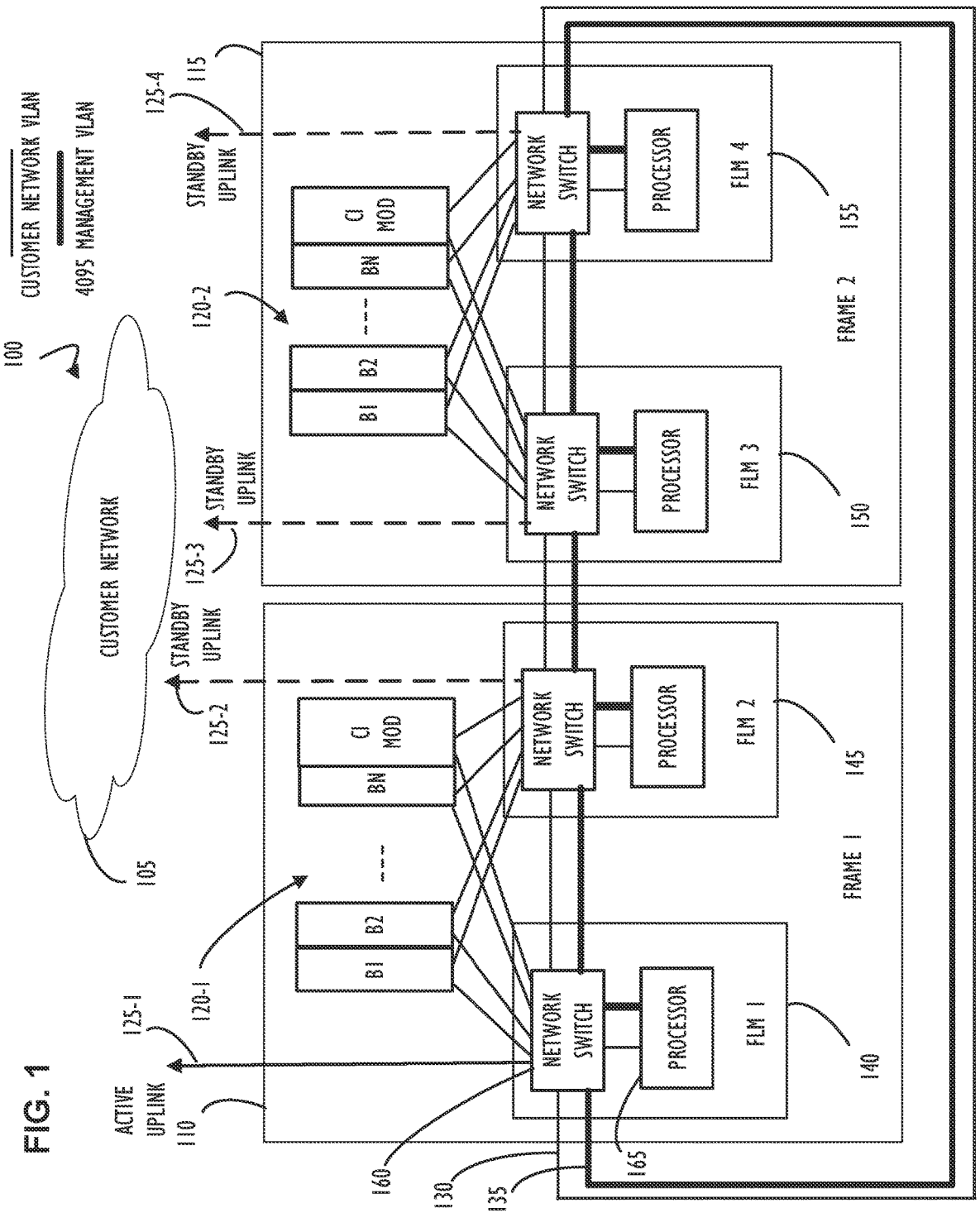
FIG. 1 is a block diagram of an example computer infrastructure including multiple frame scalable compute resources, a customer VLAN, and a management VLAN for uplink connectivity determination.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A scalable compute resource may be architected as a Composable Infrastructure (CI) which provides compute, storage, and networking functionalities. A system administrator can manage, assemble and scale resources on the scalable compute resource. The frame is the base infrastructure of a scalable compute resource that pools resources of compute, storage, fabric, cooling, power and scalability. Each frame may provide an uplink service to an external network so that compute blades in the frames may be accessed and serviced externally. The external network refers to a network which is outside the frame or the group of frames which may be part of a management Virtual Local Area Network (VLAN). The external network may be a user/customer network from where a network administrator/user may deploy, service, and maintain the compute resources in the frames.

A ring network topology is typical for a group of frames. Each frame in the ring network may be configured with redundant network modules called frame link modules (FLMs) that contain a processing resource, such as a Central Processing Unit (CPU), and a switch which provides redundancy for a network connection to the compute blades and connectivity between the frames. Within a given frame, one FLM is active and the other is standby. Each FLM may send commands to enable/disable links on other network switches using remote sockets. Each FLM may also reboot the other FLM in the same frame (referred to as a neighbor FLM). Every FLM in the ring has the capability to provide the uplink to the customer network but only one uplink is designated as an active uplink for the entire group of frames in the ring and other uplinks are designated as standby uplinks. According to the International Telecommunication Union (ITU) G.8032 standard protocol, the Ring Protection Layer (RPL) owner node, also referred to as ring owner or owner FLM for a ring, is chosen statically. In some examples, the FLM selected as a ring "owner" may be responsible for designating the active uplink to provide ring connectivity.

As explained in more detail below, the ring network of frames may include a management network and a customer network supported by the scalable compute resource and may utilize VLANs. In ring networks of frames a loop prevention protocol, such as G.8032 may be used. Operations, Administration and Maintenance (OAM) functions and mechanisms for such ring networks may be managed based on the Y.1731 standard. The customer network may include a large number of network switches. For the frames in a ring to be accessible to a user connecting to any network switch of the customer network, the switch shall be correctly configured and connected to the same layer 2 (L2) network to which uplink ports of the ring are connected. L2 or data link layer refers to the second level of the seven-layer Open Systems Interconnection (OSI) Model of computer networking. This layer is the protocol layer that transfers data between nodes on a network segment across the physical layer. In an example, if a switch in the customer network is connected to L2 of a network different from that of the uplink ports, the compute resources in the ring may be unavailable from that particular switch. In another example, if an uplink is connected to L2 of a network different from that of other uplinks and customer switches, the compute resources in the ring may be unreachable from such an uplink and its connected neighbour switches in the customer network. Thus, correct configuration and connection of the uplinks and switches in the customer network is necessary so that they form part of a single layer of a network, i.e., L2 of the network. Above-described techniques pose issues with uplink configuration and connectivity with the customer network which conventional techniques are not addressing.

Accordingly, techniques disclosed below allow determining whether a standby uplink port and network switches in the customer network between the standby uplink port and the current active uplink port are correctly configured and are connected to the same layer of the network, i.e., L2 of the network. This allows in reducing/eliminating loss of connectivity between the customer network and the compute resources in the ring and thereby reducing downtime. Therefore, the disclosed techniques are more efficient compared to the conventional techniques.

Methods for determining whether the uplinks and network switches in the customer network are correctly configured are disclosed. The method includes generating, by an FLM in a frame belonging to a group of frames connected in a ring network, an uplink discovery packet. The uplink discovery packet includes information regarding a status and an identifier of a standby uplink port of the FLM. The standby uplink port is configured in a Virtual Local Area Network (VLAN) unused by other ports of the FLM, such that no packets are forwarded to the standby uplink port from the other ports. The method includes determining, by the FLM and based on a system description of an LLDP packet received by the standby uplink port from a customer network, that the standby uplink port has a link to the customer network. The method includes forwarding, by the FLM, the uplink discovery packet to the standby uplink port via a Peripheral Component Interconnect (PCI) interface coupled to the standby uplink port. The standby uplink port is configured to override the VLAN while forwarding packets received via the PCI interface. The method includes sending, by the FLM, the uplink discovery packet to the customer network through the standby uplink port, where the uplink discovery packet is directed to a unicast destination address of an owner FLM in the same ring network. The method includes monitoring, by the owner FLM, receipt of the uplink discovery packet from the customer network through a current active uplink port in the ring network. The method includes determining, by the owner FLM and based on successful receipt of the uplink discovery packet, that the standby uplink port and a set of switches in the customer network between the standby uplink port and the current active uplink port are correctly configured. In an example, in response to determining that the standby uplink port and the set of switches are correctly configured, the standby uplink port may be included in a set of potential uplink ports from which a new active uplink port may be selected on failure of the current active uplink port. Thus, the incorrectly connected uplink or uplink with incompatible VLAN configuration is prevented from being selected as the active uplink, consequently reducing/eliminating chances of loss of connectivity to the frames in the ring network. This allows in reduction of downtime due to loss of access to the compute resources in the ring and performance may be enhanced. Also, in another example, misconfiguration of one of the switches in the customer network may be identified based on non-receipt of the uplink discovery packet. This may also allow in identification of configuration or connection error in the customer network.

FIG. 1 is a block diagram of an example computer infrastructure 100 for uplink connectivity determination. In this example, customer network 105 is connected to a group of frames (represented by frame 1 (110), and frame 2 (115)). In some examples, more than two frames may be present in a ring, but for simplicity of this disclosure only two are shown in this example. As indicated by arrow 120-1, frame 1 may be configured with a set of blades (B1, B2, . . . BN) and a Composable Infrastructure (CI) module. Similarly, arrow 120-2 indicates that frame 2 may be configured in a like manner. Frame 1 further includes two Frame Link Modules (FLMs), namely FLM 1 (140) and FLM 2 (145) (also referred to as a Network Module). Frame 2 also includes two FLMs, namely FLM 3 (150) and FLM 4 (155). These FLMs provide connectivity for the compute resources represented by the respective blades within their frame. Each of the blades is shown with a network connection to a network switch (referred to as network switch 160 for FLM 1), respectively disposed within each individual FLM (e.g., FLM 1 (140) through FLM 4 (155)). Each FLM further includes a processor (referred to as processor 165 for FLM 1) to facilitate configuration, monitoring, and maintenance of a corresponding network switch (referred to as network switch 160 for FLM 1). Thus, each frame with an FLM may represent a network node in a ring network and may comprise a processor, an uplink port to send and receive packets in an external network, and a memory (not shown in FIG. 1) coupled to the processor and the memory storing instructions executable by the processor.

Connectivity from the group of frames (Frame 1 and Frame 2) to a customer network 105 is provided by a single active uplink 125 from one of the plurality of network switches that exist across the multiple FLMs of the group of frames connected in a ring network. That is, all communications external to the group of connected frames passes through uplink 125. Please note that an "uplink," as used herein, may also be referred to as a "management port" or an "uplink port". Users connecting to the customer network 105 may access compute resources of the frames in the ring network. The uplink 125 is configured in a management mode, where the uplink 125 is set to exchange traffic with the customer network 105. The management mode is indicative of a mode of operation of the uplink in which the uplink is connected to an external network, such as the customer network 105, and the uplink can exchange data traffic with the external network. Typically, the uplink 125 is connected with a port of a network switch (not shown in FIG. 1) in the customer network 105. Both the uplink 125 and the port of the network switch in the customer network should be configured to receive untagged traffic and drop tagged VLAN traffic for operation in the management mode. Standby uplinks 125-2, 125-3, and 125-4 are illustrated to be available (e.g., if needed as a result of failure to uplink 125) from other network switches. In an example, the standby uplinks are also configured in the management mode.

As further illustrated in computer infrastructure 100, customer network VLAN 130 connects each of the network switches 160 in an ethernet ring network and extends to the customer network 105. A second ring network, management VLAN 135, is also shown as an isolated network in computer infrastructure 100. Management VLAN 135 is shown in a bolder line than customer network VLAN 130 and also connects each of the network switches. Note, in a proper configuration of a group of frames, each node will be directly connected to each neighboring node (either in the same frame or an adjacent frame) and no intervening network devices are present.

A virtual LAN (VLAN) refers to a broadcast domain that is partitioned and isolated (i.e., logically isolated) in a computer network at the data link layer (OSI layer 2). LAN is the abbreviation for local area network and when used in the context of a VLAN, "virtual" refers to a physical object recreated and altered by additional logic. A VLAN is a custom network created from one or more existing LANs. It enables groups of devices from multiple networks (both wired and wireless) to be combined into a single logical network. The result is a virtual LAN that can be administered like a physical local area network, for example management VLAN 135 in computer infrastructure 100.

Figure 2:
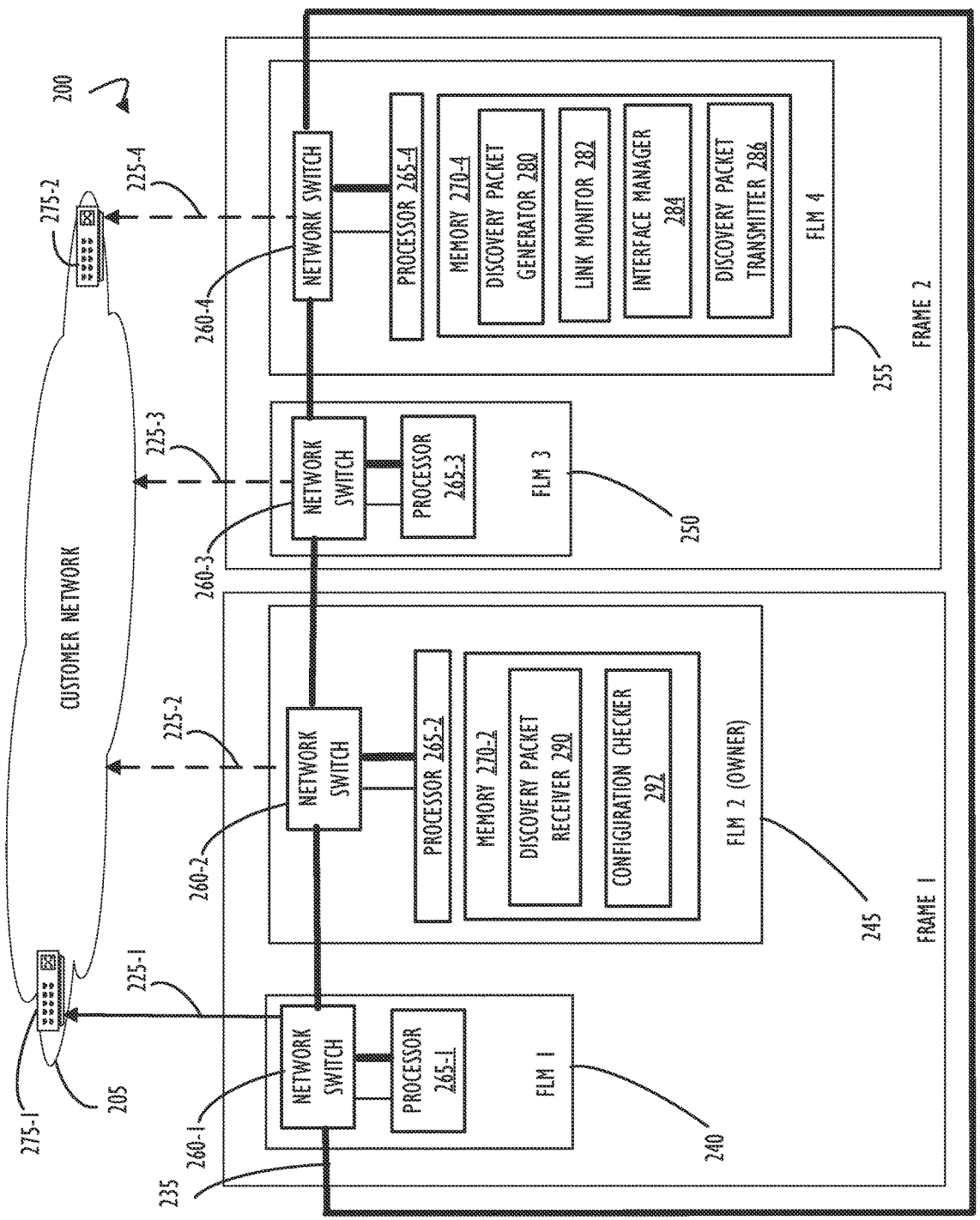
FIG. 2 is a block diagram of an example computer infrastructure including multiple frame scalable compute resources with uplinks connected to network devices in an external network for uplink connectivity determination.

Referring now to FIG. 2, a different view of FIG. 1 is presented as computer infrastructure 200 with certain elements not shown and certain additional elements shown for clarity of discussion. Like in FIG. 1, computer infrastructure 200 illustrates four FLMs, namely FLM 1 (240), FLM 2 (245), FLM 3 (250), and FLM 4 (255). The four FLMs are connected in a management VLAN 235, similar to the management VLAN 135 of FIG. 1, thereby forming a ring network of a group of FLMs. Also, each FLM is illustrated to include a network switch 260-1 to 260-4, respectively coupled to a respective processor 265-1 to 265-4 coupled to a respective memory. In the FIG. 2, memory 270-2 is coupled to processor 265-2 and memory 270-4 is coupled to processor 265-4. The memories coupled to processors 265-1 and 265-3 in FLM 1 and FLM 3, respectively, are not shown in FIG. 2.

Each of the processors 265 may include a single or multiple Central Processing Units (CPU) or another suitable hardware processor(s), such as a network ASIC. Each of the memories 270 may store machine readable instructions which may executed by respective processors 265. Each of the memories 270 may include any suitable combination of volatile and/or non-volatile memory, such as combinations of Random Access Memory (RAM), Read-Only Memory (ROM), flash memory, and/or other suitable memory.

As shown in FIG. 2, the memory 270-4 stores instructions to be executed by the processor 265-4 including instructions for discovery packet generator 280, link monitor 282, interface manager 284, and discovery packet transmitter 286. Further, the memory 270-2 stores instructions to be executed by the processor 265-2 including instructions for discovery packet receiver 290 and configuration checker 292.

As further illustrated in FIG. 2, each network switch 260-1 to 260-4, collectively also referred to as network switches 260, is shown to have at least two ports that connect to other network modules (240, 245, 250, and 255). As in FIG. 1, it may be desirable for each of the two link ports to connect directly to a network module within the ring topology and not have any intervening devices between network modules (240, 245, 250, and 255). As in FIG. 1, frame 1 may be configured with a set of blades (B1, B2, . . . BN) and a Composable Infrastructure (CI) module. Frame 2 may be configured in a like manner.

In an example, each of the processors 265 may be coupled to a respective network switch 260 via a Peripheral Component Interconnect (PCI) interface (not shown). The PCI interface refers to a local bus for attaching hardware devices in the FLM and is part of the PCI Local Bus standard. The PCI bus supports the functions of the processors. Packets from the processors 265 via the PCI interface to the network switches 260 may be directed to any port connected to the network switches 260.

Each of the network switches 260 has an uplink port. As shown in FIG. 2, the uplink 225-1 of network switch 260-1 is connected to a switch 275-1 in the customer network 205. Uplink 225-4 of network switch 260-4 is connected to switch 275-2 in the customer network 205. Similarly, uplinks 225-2 and 225-3 are also connected to switches (not shown) deployed in the customer network 205. The customer network 205 is an external network to which the group of frames 1 and 2 may be connected through a single active uplink 225-1 so that compute blade resources may be accessed and serviced externally from the customer network 205. The customer network 205 may include a set of switches connected to each other over ethernet links such that the set of switches including the switches 275-1 and 275-2 are in the same layer of the network, i.e., L2 of the network. The customer network 205 is similar to the customer network 105 of FIG. 1. In the illustration of FIG. 2, the uplink 225-1 is illustrated as the single active uplink selected by an owner FLM, i.e., FLM 2 from the group of frames in the ring network. In some examples, the owner FLM also called the Ring Protection Layer (RPL) owner node is manually selected by a technician according to the ITU G.8032 standard. A configuration utility (e.g., user-interactive utility) may be provided so that the technician may choose a node in the ring and designate it as the owner FLM. Thus, generally the owner FLM may be selected by user intervention either at initial startup or in reaction to failure of an owner FLM.

The owner FLM may be responsible for designating which FLM may enable its uplink to the customer network to provide ring connectivity. In some examples, a management Port Selection Protocol may be used by the owner FLM to select the active uplink or to advertise that a new uplink may be needed. Other nodes may also use this protocol to send a message to the owner FLM stating that they have an uplink available to use (e.g., a registration process to "get in line"). In an example, all FLMs in the ring that have an uplink port connected may send a packet to the owner FLM stating they have an uplink and it may be used as the active (e.g., register with the owner FLM). The contents of this packet may contain the MAC address of the FLM with the uplink and the MAC address of the other FLM in the frame (i.e., its neighbor). The owner FLM may save these packets in a registration table and randomly select one FLM from the registration table to enable its uplink and become active and the other uplinks in the table will be designated as standby uplinks.

Upon failure of an active uplink, a new single active uplink may be selected (from a set of available backups) responsive to detection of that failure. Heartbeat style messaging may be implemented to share coordination and status information across nodes working together. The FLM with the active uplink may send heartbeat status messages to the owner FLM stating that its link is active. If the owner FLM does not receive the heartbeat messages from the FLM with the active uplink, the owner FLM may conclude that the FLM with active uplink is subject to a failure or is rebooting. In response to determining that there is a failure in the FLM with the active uplink, the owner FLM may randomly select, from the registration table, one of the standby uplinks to become active.

During initial setup and configuration, all uplinks in the computer infrastructure 200 are by default configured in different VLANs either manually or by using Application Programming Interfaces (APIs) and software utilities. Each uplink port is tagged to receive traffic in its designated VLAN and therefore, the traffic of the uplinks is isolated from each other by these VLANs. Once the owner FLM designates an uplink as the single active uplink, a technician may configure the single active uplink as an untagged port. Thus, each standby uplink remains configured in a different VLAN in which no other ports of the ring network are configured. Thus, he standby uplinks are isolated in their respective VLANs and no traffic is received at the standby uplinks from the other ports of the FLM or from the customer network, except Link Layer Discovery Protocol (LLDP) packets. In the FIG. 2, uplinks 225-2, 225-3, and 225-4 are designated as standby uplinks.

In the FIG. 2, a technician may select FLM 2 as the owner FLM as explained earlier. Uplinks 225-1 to 225-4 are by default configured in a management mode. The owner FLM 2 may select uplink 225-1 as a current active uplink port and uplinks 225-2 to 225-4 are as standby uplink ports. According to the techniques of the present disclosure, the owner FLM may determine whether a standby uplink port and a set of switches in the customer network between the standby uplink port and the current active uplink port are correctly configured. Although, the manner in which this determination is made is elaborated with reference to FLM 4 and its standby uplink 225-4, the described method may apply (with appropriate modifications, if applicable) to other FLMs, namely FLMs 2 and 3, with standby uplinks 225-2 to 225-3.

In response to the owner FLM 2 selecting the single active uplink 225-1 and designating 225-2 to 225-4 as standby uplinks, the discovery packet generator 280 may generate an uplink discovery packet including information regarding a status and an identifier of the standby uplink port 225-4 of the FLM 4. The status of the standby uplink 225-4 may indicate that the uplink 225-4 is in standby condition and the identifier of the standby uplink 225-4 may include a MAC address of the standby uplink 225-4. In an example, the uplink discovery packet includes a MAC address of the owner FLM, i.e., FLM 2 and interface information of a switch 275-2 from the set of switches to which the standby uplink port 225-4 is connected. In an example, the uplink discovery packet is directed to a unicast destination address of an owner FLM in the ring network, such as FLM 2 in FIG. 2. Further, the standby uplink 225-4 may be configured in a VLAN (not shown) unused by other ports of the ring network, such that the standby uplink 225-4 do not receive packets from the other ports.

In an example, the uplink discovery packet may be in the format of a Ring-Advanced Protection Switching (R-APS) Protocol Data Unit (PDU) format and may be transmitted using G.8032 protocol messages. An example R-APS PDU format is shown in FIG. 3. In the packet shown in FIG. 3, the Version, OpCode, and Flags are defined by Y.1731 standard for Operations, Administration and Maintenance (OAM) functions and mechanisms for Ethernet-based networks. R-APS specific information is added in 32 octets from 5 to 36. Type-length-value (TLV) is an encoding scheme used for optional information element in a certain protocol. Using TLV, information of the uplink discovery packet may be included in the R-APS PDU. Optional TLV may be included in octet number 37. In the uplink discovery packet, the optional TLV may include a MAC address of the FLM from which the uplink discovery packet has originated, i.e., FLM 4 in this case, IPv6 link layer address of FLM 4, bay number of FLM 4, ring owner MAC address, i.e., MAC address of FLM 2, LLDP port description, state of the FLM 4, and timeout information. With reference to FIG. 2, the ring owner MAC address is the MAC address of FLM 2 which is selected as the owner FLM, the LLDP port description of the uplink discovery packet from FLM 4 may include the interface information of the switch 275-2 with which the uplink 225-4 of FLM 4 is connected. The state of the FLM 4 may indicate that the uplink 225-4 of the FLM 4 is in standby mode. The timeout information defines a time limit for which information in the uplink discovery packet may be considered valid. After expiry of the time limit mentioned in the timeout information, the uplink discovery packet may be considered as outdated.

The processor 265-4 executes the link monitor 282 which may cause the FLM 4 to determine that the standby uplink port 225-4 has a link to the customer network 205. The presence of the link may indicate that the standby uplink 225-4 is connected to the switch 275-2 in the customer network 205 though an ethernet connection. In an example, the link monitor 208 may check whether an LLDP packet is received at the uplink port 225-4. The link monitor 208 may use a packet sniffer or packet analyzer utility to detect and analyze the LLDP packet. In an example, a system description may be present in the LLDP packet which may indicate a source device from which the LLDP packet has originated. Based on analysis of the system description associated with the LLDP packet, the source device of the LLDP packet may be identified. Thus, the FLM 4 may determine that the standby uplink port 225-4 is connected to the source device, i.e., the switch 275-2 in the customer network 205, in this case. Therefore, using the system description of the LLDP packet received at the standby uplink port, the FLM may determine whether the standby uplink port has link to the customer network.

The processor 265-4 executes the interface manager 284 which may cause the FLM 4 to forward the uplink discovery packet to the standby uplink port 225-4 via a Peripheral Component Interconnect (PCI) interface coupled to the network switch 260-4. Since the standby uplink is by default configured as a tagged port in its designated VLAN, the interface manager 284 may configure the standby uplink 225-4 to override the VLAN in which it is configured while forwarding packets received via the PCI interface. Overriding the VLAN includes forwarding the uplink discovery packet to the customer network as untagged traffic even if the standby uplink 225-4 may be isolated in a VLAN. The processor 265-4 executes the discovery message transmitter 286 which may cause the FLM 4 to send the uplink discovery packet to the customer network 205 through the standby uplink port 225-4. In an example, the uplink discovery packet may be received at a port of the switch 275-2 in the customer network 205 to which the uplink 225-4 is connected. In an example, the switch 275-2 is a top-of-rack (ToR) switch and may be connected to other ToR switches in the customer network 205, such as the switch 275-1.

Top-of-rack switching is a data center architecture design in which computing equipment like servers, appliances and other switches located within the same or adjacent rack are connected to an in-rack network switch also called a ToR switch. The uplink discovery packet sent over the standby uplink 225-4 may be received at a port of the switch 275-2 and may travel across the set of switches in the customer network 205. Since the uplink discovery packet is directed to the owner FLM 2, if the switches in the customer network and the uplinks are correctly configured, the uplink discovery packet should be forwarded back to the ring network via the current active uplink 225-1 of FLM 1 to the destination, i.e., owner FLM 2.

The processor 265-2 executes the discovery packet receiver 290 in the owner FLM 2 which may cause the owner FLM 2 to monitor receipt of the uplink discovery packet from the customer network 205 through the current active uplink port 225-1 in the ring network. In an example, the processor 265-2 may execute the discovery packet receiver 290 to check for the presence of an OpCode in the 37$^{th}$ Octet of the R-APS PDU format as shown in FIG. 3. In an example, if the uplink discovery packet is successfully received at the owner FLM 2, the processor 265-2 executes the configuration checker 292 which may cause the owner FLM 2 to determine, based on the successful receipt of the uplink discovery packet, that the standby uplink port 225-4 and the set of switches in the customer network 205 between the standby uplink port 225-4 and the current active uplink port 225-1 are correctly configured. Although the above explanation is with reference to standby uplink port 225-4 of FLM 4, configuration of the standby uplinks 225-2 and 225-3 may be similarly checked.

In response to determining that the standby uplink 225-4 and the set of switches in the customer network 205 are correctly configured, the owner FLM 2 may store the status and identifier of the standby uplink 225-4 in a set of potential uplink ports. The set of potential uplink ports may include a list of uplinks which are determined to be correctly configured. In an example, the set of potential uplink ports may be included in the registration table from which the owner FLM 2 may select a new active uplink in response to failure of the current active uplink 225-1.

In some examples, the processor 265-2 executes the configuration checker 292 which may cause the owner FLM 2 to determine, based on non-receipt of the uplink discovery packet, that the standby uplink port 225-4 or at least one of the set of switches in the customer network 205 between the standby uplink port 225-4 and the current active uplink port 225-1 are misconfigured. For example, if the uplink discovery packet is not received by the owner FLM 2 after monitoring for a threshold time, say 60 seconds, then it may be determined that the uplink discovery packet is not received. The threshold time may be set manually by a user or may be predefined. On determining that the standby uplink port 225-4 or at least one of the set of switches in the customer network 205 is misconfigured, the FLM 2 may identify that the group of frames, viz., Frame 1 and Frame 2 is unreachable from the at least one switch. Further, in an example, the owner FLM 2 may remove the information regarding the status and the identifier of the standby uplink port from the set of potential uplink ports, in response to expiry of a threshold time from the receipt of the uplink discovery packet. In an example the threshold time is set in the timeout information of the uplink discovery packet. The timeout information defines a time limit for which information in the uplink discovery packet may be considered valid. After expiry of the time limit mentioned in the timeout information, the uplink discovery packet may be considered as outdated. In an example, the timeout information is set by a network administrator and is a predefined value.

Figure 4:
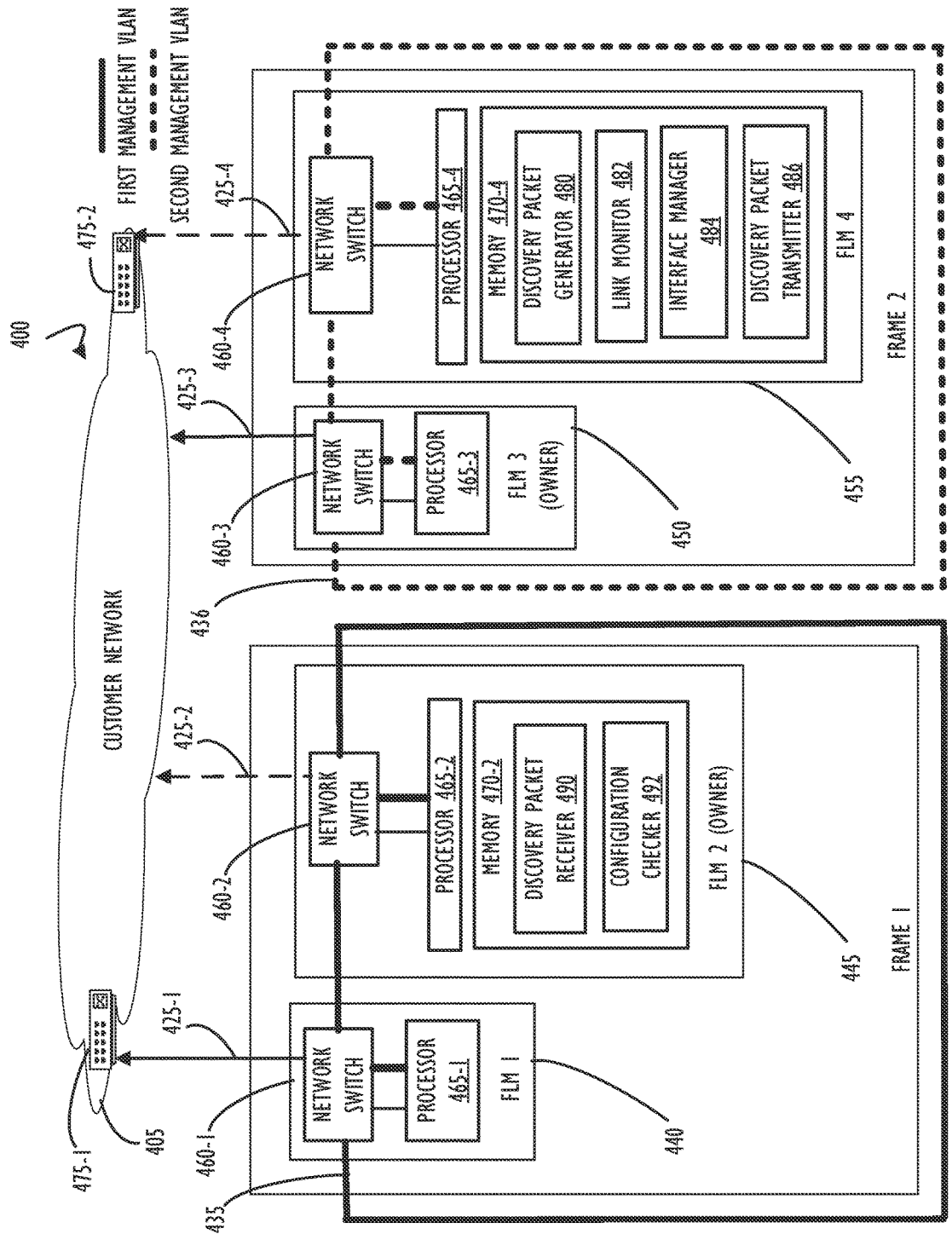
FIG. 4 is a block diagram of an example computer infrastructure including multiple ring networks of frame scalable compute resources with uplinks connected to network devices in a customer network for uplink connectivity determination.

FIG. 4 is a block diagram of an example computer infrastructure 400 including multiple ring networks of frame scalable compute resources with uplinks connected to network devices in a customer network. Like in FIG. 2, computer infrastructure 400 illustrates four FLMs, namely FLM 1 (440), FLM 2 (445), FLM 3 (450), and FLM 4 (455). Also, each FLM is illustrated to include a network switch 460-1 to 460-4, respectively coupled to a respective processor 465-1 to 465-4 coupled to a respective memory. In the FIG. 4, memory 470-2 is coupled to processor 465-2 and memory 470-4 is coupled to processor 465-4. The memories coupled to processors 465-1 and 465-3 in FLM 1 and FLM 3, respectively, are not shown in FIG. 4. Each of the processors 465 and each of the memories 470 may be identical to the processors 265 and memories 270 from FIG. 2.

As shown in FIG. 4, the memory 470-4 stores instructions to be executed by the processor 465-4 including instructions for discovery packet generator 480, link monitor 482, interface manager 484, and discovery packet transmitter 486. Discovery packet generator 480, link monitor 482, interface manager 484, and discovery packet transmitter 486 are example implementations of discovery packet generator 280, link monitor 282, interface manager 284, and discovery packet transmitter 286 from FIG. 2. Further, the memory 470-2 stores instructions to be executed by the processor 465-2 including instructions for discovery packet receiver 490 and configuration checker 492. Discovery packet receiver 490 and configuration checker 492 are example implementations of discovery packet receiver 290 and configuration checker 292 from FIG. 2.

As further illustrated in FIG. 4, each network switch 460-1 to 460-4, collectively also referred to as network switches 460, is shown to have at least two ports that connect to other network modules (440, 445, 450, and 455). In an example, each of the processors 465 may be coupled to a respective network switch 460 via a Peripheral Component Interconnect (PCI) interface. The PCI interface refers to a local bus for attaching hardware devices in the FLM and is part of the PCI Local Bus standard. The PCI bus supports the functions of the processors. Packets from the processors 465 via the PCI interface to the network switches 460 may be directed to any port connected to the network switches.

As shown in FIG. 4, the uplink 425-1 of network switch 460-1 is connected to a switch 475-1 in the customer network 405. Uplink 425-4 of network switch 460-4 is connected to switch 475-2 in the customer network 405. Similarly, uplinks 425-2 and 425-3 are also connected to switches (not shown) deployed in the customer network 405. The customer network 405 is similar to the customer network 205 of FIG. 2 and may include a set of switches connected to each other over ethernet links such that the set of switches including the switches 475-1 and 475-2 are in the same layer, i.e., L2 of the network.

As shown in FIG. 4, the computer infrastructure 400 includes two ring networks unlike a single ring network 235 in FIG. 2. In FIG. 4, a first management VLAN 435 connects each of the network switches 460-1 and 460-2 in an ethernet ring network. A second management ring network, second management VLAN 436, is also shown as an isolated network in computer infrastructure 400. The second management VLAN 436 is shown in a dotted line and connects each of the network switches 460-3 and 460-4. In FIG. 4, although the first management VLAN 435 is illustrated to include a single frame, i.e., Frame 1, in an example there can be multiple frames connected in a single management ring. Similarly, although the second management VLAN 436 is illustrated to include a single frame, i.e., Frame 2, in an example there can be multiple frames connected in a single management ring. In the illustration of FIG. 4, consider that FLM 2 is selected as the owner FLM for the first management VLAN 435 and FLM 3 is selected as the owner FLM for the second management VLAN 436. Since, two separate ring networks, first management VLAN 435 and second management VLAN 436 are illustrated, two separate ring owners for each of the ring networks are selected. The uplink 425-1 is illustrated as the active uplink selected by the owner FLM 2 for the ring network of the first management VLAN 435 and the uplink 425-3 is illustrated as the active uplink selected by the owner FLM 3 for the ring network of the second management VLAN 436.

According to the techniques of the present disclosure it may be determined whether an uplink port and a set of switches in the customer network between the uplink port and the current active uplink port are correctly configured. Although, the below description is elaborated with reference to FLM 4 and its uplink 425-4, the described method may apply with necessary alterations to other FLMs, namely FLMs 1, 2 and 3, with uplinks 425-1 to 425-3.

The processor 465-4 executes the discovery packet generator 480 which may cause the FLM 4 to generate an uplink discovery packet including information regarding a status and an identifier of the uplink port 425-4 of the FLM. In an example, the uplink discovery packet includes a broadcast destination address. In an example the broadcast destination address is a MAC address that indicates a switch receiving the uplink discovery packet to forward the uplink discovery packet to all its ports except the port form which it is received. An example of the broadcast destination MAC address may be FF:FF:FF:FF:FF:FF. Thus, the uplink discovery packet when received by the switch 475-2 may be flooded in the L2 of the network including the switches 475-1 and 475-2 of the customer network 405 and the network switches 460 of the rings which are connected in the same layer of the network. Further, the uplink discovery packet may be broadcast by the network switches 460 to owner FLMs belonging to each of the rings, such as owner FLM 2 and owner FLM 3 of the first management VLAN ring and the second management VLAN ring, respectively. In an example, the uplink discovery packet includes an interface information of the switch 475-2 from the set of switches to which the uplink port 425-4 is connected.

The status of the uplink 425-4 may be "active" or "standby" thereby indicating that the uplink 225-4 is in active or standby condition and the identifier of the uplink 425-4 may include a MAC address of the uplink 425-4. In an example, the uplink discovery packet may be in the format of a Ring-Advanced Protection Switching (R-APS) Protocol Data Unit (PDU) format and may be transmitted using G.8032 messages. In some examples, the uplink discovery packet may have a format as shown in FIG. 3

The processor 465-4 executes the link monitor 482 which may cause the FLM 4 to determine that the uplink port 425-4 has a link to the customer network 405. The presence of the link may indicate that the uplink 425-4 is connected to the switch 475-2 in the customer network 405 though an ethernet connection. In an example, the processor 465-4 may execute the link monitor 482 to check whether an LLDP packet is received at the uplink port 425-4. If an LLDP packet is received at the uplink port 425-4, the processor 465-4 may execute the link monitor 482 to analyze the LLDP packet. In an example, a system description may be present in the LLDP packet which may indicate a source device from which the LLDP packet has originated. Based on analysis of the system description associated with the LLDP packet, the source device of the LLDP packet may be identified. Thus, the FLM 4 may determine that the uplink port 425-4 is connected to the source device, i.e., the switch 475-2 in the customer network 405.

The processor 465-4 executes the interface manager 484 which may cause the FLM 4 to forward the uplink discovery packet to the uplink port 425-4 via a PCI interface coupled to the network switch 460-4. The processor 465-4 executes the discovery message transmitter 486 which may cause the FLM 4 to send the uplink discovery packet to the customer network 405 through the uplink port 425-4. In an example, the uplink discovery packet is received at a port of the switch 475-2 in the customer network 405 to which the uplink 425-4 is connected. In an example, the switch 475-2 is a top of the rack (ToR) switch and may be connected to other ToR switches in the customer network 405, such as the switch 475-1. The uplink discovery packet sent over the uplink 425-4 may be received at a port of the switch 475-2 and may travel across the network of switches in the customer network 405. Since the uplink discovery packet is directed to the broadcast destination address, if the network is correctly configured, the packet should be forwarded back to the ring networks via respective current active uplinks of the ring networks. Referring to FIG. 4, the uplink discovery packet should be forwarded back to first management VLAN ring via active uplink 425-1 to the owner FLM 2. Also, since the uplink discovery packet is broadcast, a copy of the uplink discovery packet should be forwarded back to second management VLAN ring via active uplink 425-3 to the owner FLM 3. Whether the packet is received back in the ring or not, is checked by FLM owners in the rings.

The processor 465-2 executes the discovery packet receiver 490 in the owner FLM 2 which may cause the owner FLM 2 to monitor receipt of the uplink discovery packet from the customer network 405 through the current active uplink port 425-1 in the ring network first management VLAN. In an example, the processor 465-2 executes the discovery packet receiver 490 to check for the presence of an OpCode in the 37$^{th}$ Octet of the R-APS PDU format as shown in FIG. 3. If the OpCode is present, the processor 465-2 may execute the discovery packet receiver 490 to conclude that the uplink discovery packet is received. In an example, if the uplink discovery packet is successfully received at the owner FLM 2, the processor 465-2 executes the configuration checker 492 which may cause the owner FLM 2 to determine, based on the successful receipt of the uplink discovery packet, that the uplink port 425-4 and the set of switches in the customer network 405 between the uplink port 425-4 and the current active uplink port 425-1 are correctly configured. Although the above explanation is with reference to uplink port 425-4 of FLM 4, configuration of the uplinks 425-1 to 425-3 may be similarly checked.

In some other examples, the processor 465-2 executes the configuration checker 492 which may cause the owner FLM 2 to determine, based on non-receipt of the uplink discovery packet, that the uplink port 425-4 or at least one of the set of switches in the customer network 405 between the uplink port 425-4 and the current active uplink port 425-1 are misconfigured. For example, if the uplink discovery packet is not received by the owner FLM 2 after a monitoring for a threshold time, say 60 seconds, then it may be determined that the uplink discovery packet is not received. On determining that the standby uplink port 425-4 or at least one of the set of switches in the customer network 405 is misconfigured, the FLM 2 may identify that the group of frames, viz., Frame 1 and Frame 2 is unreachable from the at least one switch.

Figure 5:
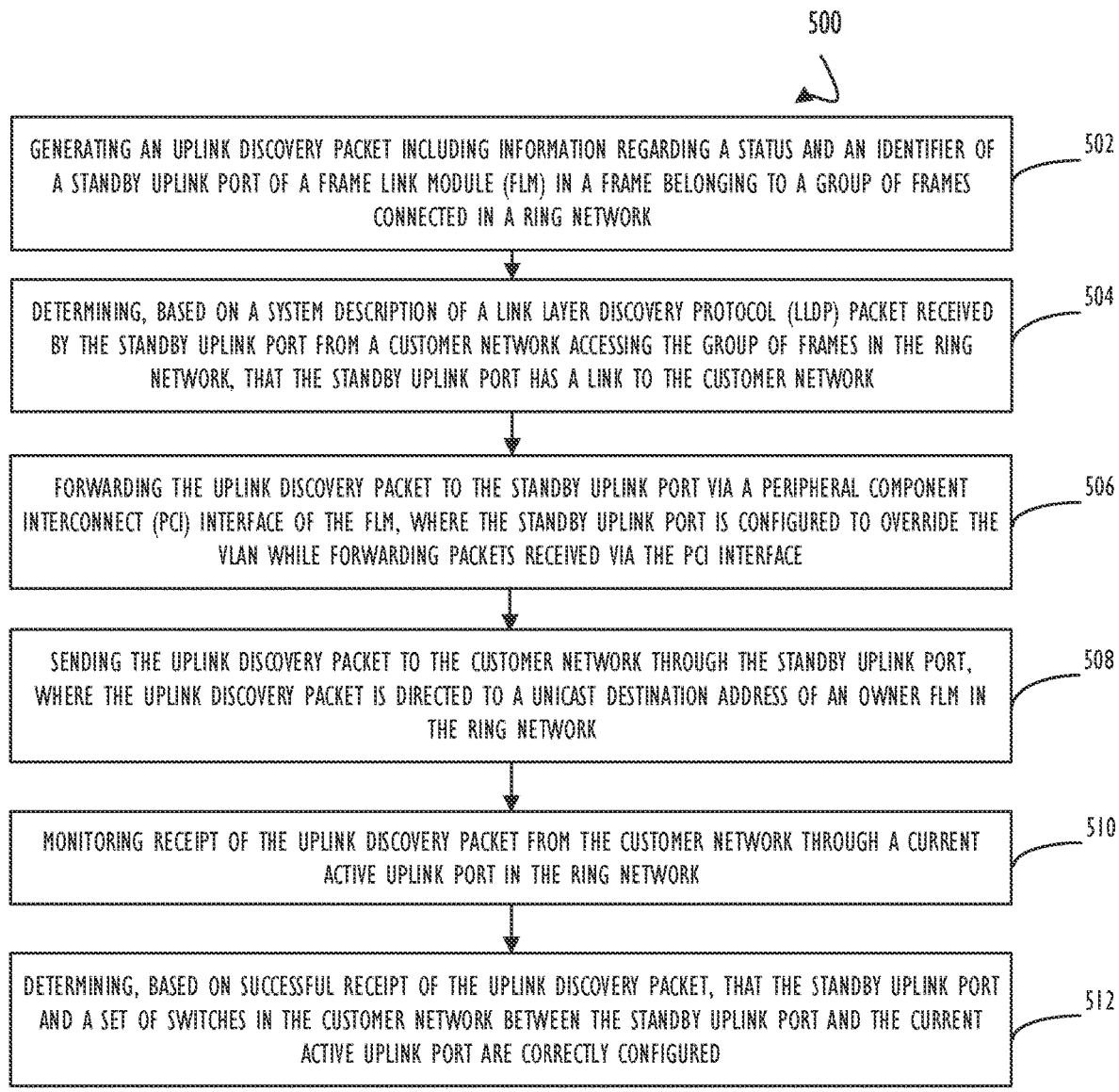
FIG. 5 is a flowchart of an example method for uplink connectivity determination.

FIG. 5 represents an example method 500 for determining whether the uplinks and network switches in the customer network are correctly configured is disclosed. The method 500 may be performed by FLMs in a ring network, such as the ring network represented by first management VLAN 235 in FIG. 2. In some examples, steps 502 to 508 may be performed by an FLM, such as FLM 2 to FLM 4 each having a standby uplink and steps 510-512 may be performed by an owner FLM, such as the owner FLM 2 of FIG. 2. Method 500 may be executed as one or more instructions on a machine (e.g., by at least one processor), where the one or more instructions are included on at least one machine-readable storage medium (e.g., a non-transitory machine readable-storage medium.). Additionally, although the blocks are shown in an order, blocks depicted in FIG. 5 may be performed in any order and at any time. Also, some of the blocks shown in method 500 may be omitted without departing from the spirit and scope of this disclosure. Method 500 may be implemented on a network node, such as frame 1 and 2 shown in FIGS. 1 and 2, according to any of the examples herein.

The method 500 begins with an operational ring network with a ring owner established and an uplink of one of the FLMs designated as an active uplink in the ring network. At block 502, an FLM in a frame belonging to a group of frames connected in a ring network may generate an uplink discovery packet including information regarding a status and an identifier of a standby uplink port of the FLM. The standby uplink port is configured in a Virtual Local Area Network (VLAN) unused by other ports of the ring network, such that the standby uplink port do not receive packets from the other ports. At block 504, based on a system description of a Link Layer Discovery Protocol (LLDP) packet received by the standby uplink port from a customer network accessing the group of frames in the ring network, the FLM may determine that the standby uplink port has a link to the customer network.

At block 506, the FLM may further forward the uplink discovery packet to the standby uplink port via a Peripheral Component Interconnect (PCI) interface of the FLM, where the standby uplink port is configured to override the VLAN while forwarding packets received via the PCI interface. At block 508, the FLM may send the uplink discovery packet to the customer network through the standby uplink port, where the uplink discovery packet is directed to a unicast destination address of an owner FLM in the ring network.

At block 510, the owner FLM may monitor receipt of the uplink discovery packet from the customer network through a current active uplink port in the ring network. At block 512, the owner FLM may determine, based on successful receipt of the uplink discovery packet, that the standby uplink port and a set of switches in the customer network between the standby uplink port and the current active uplink port are correctly configured.

Figure 6:
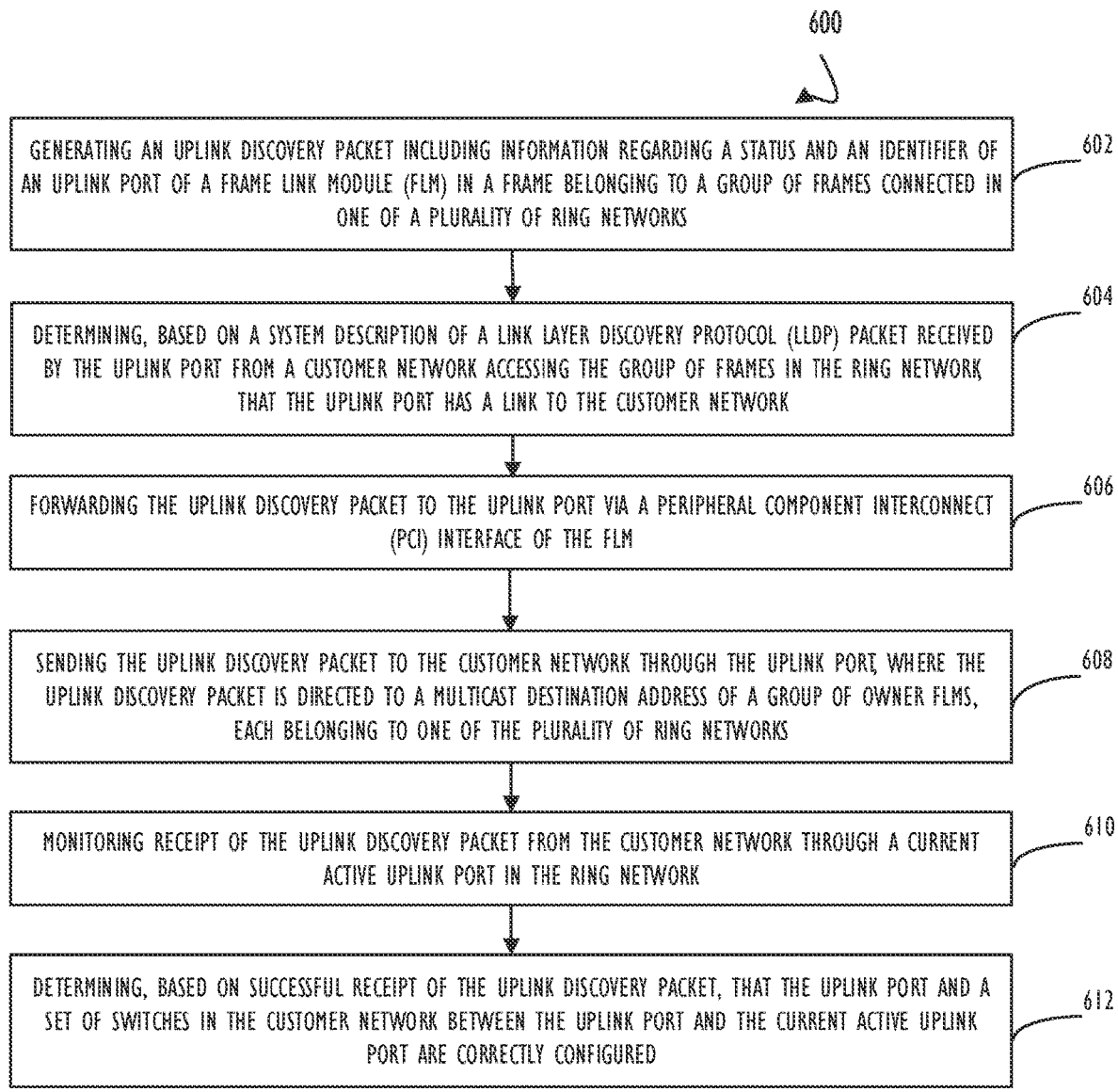
FIG. 6 is a flowchart of another example method for uplink connectivity determination.

FIG. 6 represents an example method 600 for determining whether the uplinks and network switches in the customer network are correctly configured is disclosed. The method 600 may be performed by FLMs belonging to a group of frames connected in one of a plurality of ring networks, such as the ring network represented by first management VLAN 435 and the ring network represented by second management VLAN 436 in FIG. 4. In some examples, steps 602 to 608 may be performed by an FLM, such as FLM 1 to FLM 4 each having an uplink (active or stand by) and steps 510-512 may be performed by an owner FLM, such as the owner FLM 2 of FIG. 4. Method 600 may be executed as one or more instructions on a machine (e.g., by at least one processor), where the one or more instructions are included on at least one machine-readable storage medium (e.g., a non-transitory machine readable-storage medium.). Additionally, although the blocks are shown in an order, blocks depicted in FIG. 6 may be performed in any order and at any time. Also, some of the blocks shown in method 600 may be omitted without departing from the spirit and scope of this disclosure. Method 600 may be implemented on a network node, such as frame 1 and 2 shown in FIGS. 1 and 2, according to any of the examples herein.

The method 600 begins with an operational ring network with a ring owner established in each ring from the plurality of rings and an uplink designated as an active uplink for each ring network. At block 602, an FLM in a frame belonging to a group of frames connected in one of a plurality of ring networks may generate an uplink discovery packet including information regarding a status and an identifier of an uplink (active or standby) of the FLM. At block 604, based on a system description of a Link Layer Discovery Protocol (LLDP) packet received by the uplink port from a customer network accessing resources in the plurality of ring networks, the FLM may determine that the uplink port has a link to the customer network.

At block 606, the FLM may further forward the uplink discovery packet to the uplink port via a Peripheral Component Interconnect (PCI) interface of the FLM. At block 608, the FLM may send the uplink discovery packet to the customer network through the uplink port, where the uplink discovery packet is directed to a broadcast destination address.

At block 610, the owner FLM may monitor receipt of the uplink discovery packet from the customer network through a current active uplink port in the ring network. At block 612, the owner FLM may determine, based on successful receipt of the uplink discovery packet, that the standby uplink port and a set of switches in the customer network between the standby uplink port and the current active uplink port are correctly configured.

Figure 7:
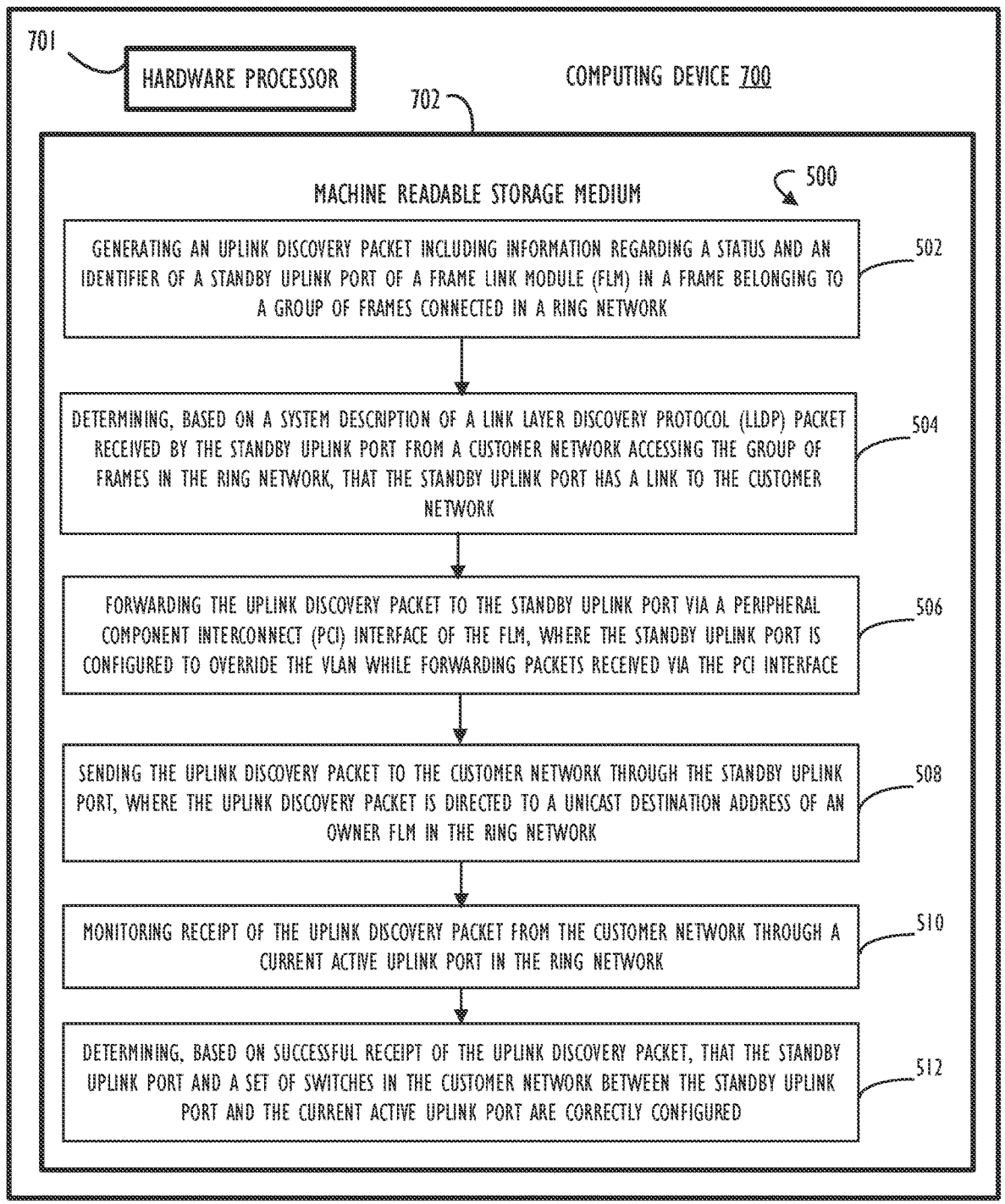
FIG. 7 illustrates an example computing device instrumented with computer instructions in which various examples described herein may be implemented for uplink connectivity determination.

FIG. 7 is an example computing device 700, with a hardware processor 701, and accessible machine-readable instructions stored on a machine-readable medium 702 for implementing one example uplink connectivity determination system, according to one or more disclosed example implementations. In an example, the computing device 700 may be a network node, such as an FLM, connected with other network nodes in a ring network. The network node may include an uplink port to send and receive packets in a customer network. FIG. 7 illustrates computing device 700 configured to perform the flow of method 500 as an example. However, computing device 700 may also be configured to perform the flow of other methods, techniques, functions, or processes described in this disclosure. In this example of FIG. 7, machine-readable storage medium 702 includes instructions to cause hardware processor 701 to perform blocks 502-512 discussed above with reference to FIG. 5.

A processing element such as processor 701 may contain one or more hardware processors, where each hardware processor may have a single or multiple processor cores. In one embodiment, the processor 701 may include at least one shared cache that stores data (e.g., computing instructions) that are utilized by one or more other components of processor 701. For example, the shared cache may be a locally cached data stored in a memory for faster access by components of the processing elements that make up processor 701. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 5, the processing elements that make up processor 701 may also include one or more of other types of hardware processing components, such as graphics processing units (GPU), application specific integrated circuits (ASICs), field-programmable gate arrays (FPGAs), and/or digital signal processors (DSPs).

The processor 701 may be operatively and communicatively coupled to a memory. The memory may be a non-transitory computer readable medium, such as the machine readable storage medium 702, configured to store various types of data. For example, the memory may include one or more storage devices that comprise a non-volatile storage device and/or volatile memory. Volatile memory, such as random-access memory (RAM), can be any suitable non-permanent storage device. The non-volatile storage devices can include one or more disk drives, optical drives, solid-state drives (SSDs), tap drives, flash memory, read only memory (ROM), and/or any other type of memory designed to maintain data for a duration of time after a power loss or shut down operation. In certain aspects, the non-volatile storage devices may be used to store overflow data if allocated RAM is not large enough to hold all working data. The non-volatile storage devices may also be used to store programs that are loaded into the RAM when such programs are selected for execution.

The machine-readable storage medium 702 of FIG. 7, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ". Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

The invention claimed is:

1. A method comprising:
generating, by a frame link module (FLM) in a frame belonging to a group of frames connected in a ring network, an uplink discovery packet comprising information regarding a status and an identifier of a standby uplink port of the FLM,
wherein the standby uplink port is configured in a Virtual Local Area Network (VLAN) unused by other ports of the ring network, such that the standby uplink port does not receive packets from the other ports;
determining, by the FLM and based on a system description of a Link Layer Discovery Protocol (LLDP) packet received by the standby uplink port from a customer network accessing the group of frames in the ring network, that the standby uplink port has a link to the customer network;
forwarding, by the FLM, the uplink discovery packet to the standby uplink port via a Peripheral Component Interconnect (PCI) interface of the FLM, wherein the standby uplink port is configured to override the VLAN while forwarding packets received via the PCI interface;
sending, by the FLM, the uplink discovery packet to the customer network through the standby uplink port, wherein the uplink discovery packet is directed to a unicast destination address of an owner FLM in the ring network;
monitoring, by the owner FLM, receipt of the uplink discovery packet from the customer network through a current active uplink port in the ring network; and
determining, by the owner FLM and based on successful receipt of the uplink discovery packet, that the standby uplink port and a set of switches in the customer network between the standby uplink port and the current active uplink port are correctly configured.

2. The method of claim 1 further comprising:
storing the information regarding the status and the identifier of the standby uplink port in a set of potential uplink ports; and
selecting a new active uplink port from the set of potential uplink ports, in response to a failure in the current active uplink port.

3. The method of claim 1, further comprising:
determining, based on non-receipt of the uplink discovery packet, that the standby uplink port or at least one of the set of switches is misconfigured.

4. The method of claim 1, further comprising removing the information regarding the status and the identifier of the standby uplink port from the set of potential uplink ports, in response to expiry of a threshold time from the receipt of the uplink discovery packet.

5. The method of claim 1, wherein the uplink discovery packet includes at least one of a MAC address of the owner FLM and interface information of a switch from the set of switches to which the standby uplink port is connected.

6. The method of claim 1, wherein the uplink discovery packet is in the format of a Ring Auto Protection Switching (R-APS) Protocol Data Unit (PDU).

7. The method of claim 1, wherein the group of frames form a Composable Infrastructure (CI) scalable compute resource and wherein the customer network is external to the CI scalable compute resource.

8. The method of claim 1, wherein the owner FLM is the Ring Protection Layer (RPL) owner node according to the International Telecommunication Union (ITU) G.8032 standard protocol.

9. The method of claim 1, wherein the group of frames connected in the ring network are configured in a management VLAN to provide an isolated communication path for management traffic between the group of frames.

10. A method comprising:
generating, by a frame link module (FLM) in a frame belonging to a group of frames connected in one of a plurality of ring networks, an uplink discovery packet comprising information regarding a status and an identifier of an uplink port of the FLM;
determining, by the FLM and based on a system description of an LLDP packet received by the uplink port from a customer network accessing resources in the plurality of ring networks, that the uplink port has a link to the customer network;
forwarding, by the FLM, the uplink discovery packet to the uplink port via a Peripheral Component Interconnect (PCI) interface coupled to the uplink port;
sending, by the FLM, the uplink discovery packet to a customer network through the uplink port, wherein the uplink discovery packet is directed to a broadcast destination address;
monitoring, by an owner FLM in a ring network from the plurality, receipt of the uplink discovery packet from the customer network through a current active uplink port of the ring network; and
determining, by the owner FLM and based on successful receipt of the uplink discovery packet, that the uplink port and a set of switches in the customer network between the uplink port and the current active uplink port are correctly configured.

11. The method of claim 10, further comprising:
determining, based on non-receipt of the uplink discovery packet, that the uplink port or at least one of the set of switches is misconfigured.

12. The method of claim 10, wherein the uplink discovery packet includes an interface information of a switch from the set of switches to which the uplink port is connected.

13. The method of claim 10, wherein the uplink discovery packet is in the format of a Ring Auto Protection Switching (R-APS) Protocol Data Unit (PDU).

14. The method of claim 10, wherein the FLM and the owner FLM are in different ring networks.

15. The method of claim 10, wherein the broadcast destination address is a broadcast MAC address.

16. A non-transitory computer readable medium comprising instructions that, when executed by a processor, cause a frame link module (FLM) in a frame belonging to a group of frames connected in a ring network to:
generate an uplink discovery packet comprising information regarding a status and an identifier of a standby uplink port of the FLM,
wherein the standby uplink port is configured in a Virtual Local Area Network (VLAN) unused by other ports of the ring network, such that the standby uplink port does not receive packets from the other ports;
determine, based on a system description of a Link Layer Discovery Protocol (LLDP) packet received by the standby uplink port from a customer network accessing the group of frames in the ring network, that the standby uplink port has a link to the customer network;
forward the uplink discovery packet to the standby uplink port via a Peripheral Component Interconnect (PCI) interface of the FLM, wherein the standby uplink port is configured to override the VLAN while forwarding packets received via the PCI interface;
send the uplink discovery packet to the customer network through the standby uplink port, wherein the uplink discovery packet is directed to a unicast destination address of an owner FLM in the ring network;
monitor receipt of the uplink discovery packet from the customer network through a current active uplink port in the ring network; and
determine, based on successful receipt of the uplink discovery packet, that the standby uplink port and a set of switches in the customer network between the standby uplink port and the current active uplink port are correctly configured.

17. The non-transitory computer readable medium of claim 16, further comprising instructions that, when executed by the processor, cause the FLM to:
store the information regarding the status and the identifier of the standby uplink port in a set of potential uplink ports; and
select a new active uplink port from the set of potential uplink ports, in response to a failure in the current active uplink port.

18. The non-transitory computer readable medium of claim 16, further comprising instructions that, when executed by the processor, cause the FLM to:
determine, based on non-receipt of the uplink discovery packet, that the standby uplink port or at least one of the set of switches is misconfigured.

19. The non-transitory computer readable medium of claim 16, further comprising instructions that, when executed by the processor, FLM to remove the information regarding the status and the identifier of the standby uplink port from the set of potential uplink ports, in response to expiry of a threshold time from the receipt of the uplink discovery packet.

20. The non-transitory computer readable medium of claim 16, wherein the uplink discovery packet includes at least one of a MAC address of the owner FLM and interface information of a switch from the set of switches to which the standby uplink port is connected.

* * * * *